(12) United States Patent
Ward et al.

(10) Patent No.: US 11,132,271 B2
(45) Date of Patent: Sep. 28, 2021

(54) DETERMINING WHICH TARGET IS MOST AHEAD IN A MULTI-TARGET MIRRORING ENVIRONMENT

(71) Applicant: INTERNATIONAL BUSIINESS MACHINES CORPORATION, Armonk, NY (US)

(72) Inventors: Matthew J. Ward, Vail, AZ (US); Nicolas M. Clayton, Warrington (GB); Joshua J. Crawford, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 449 days.

(21) Appl. No.: 16/116,449

(22) Filed: Aug. 29, 2018

(65) Prior Publication Data

US 2020/0073771 A1     Mar. 5, 2020

(51) Int. Cl.
  *G06F 11/20* (2006.01)
  *G06F 3/06* (2006.01)
  *G06F 16/27* (2019.01)

(52) U.S. Cl.
  CPC .......... *G06F 11/2082* (2013.01); *G06F 3/065* (2013.01); *G06F 3/0607* (2013.01);
  (Continued)

(58) Field of Classification Search
  CPC ......... G06F 17/30575; G06F 17/30286; G06F 17/30067; G06F 17/30008; G06F 11/2076; G06F 11/1446; G06F 11/2058; G06F 3/065; G06F 16/275; G06F 11/2064; G06F 11/2074; G06F 11/2082; G06F 3/0689; G06F 3/0607; G06F 16/273; G06F 11/20; G06F 3/06; H04L 29/0854

See application file for complete search history.

(56) References Cited

U.S. PATENT DOCUMENTS

| 8,788,772 B2 | 7/2014 | Clayton et al. |
| 9,576,040 B1 | 2/2017 | Cox et al. |

(Continued)

OTHER PUBLICATIONS

P. Mell, et al., "Effectively and Securely Using the Cloud Computing Paradigm", NIST, Information Technology Laboratory, Oct. 7, 2009, pp. 80.

(Continued)

*Primary Examiner* — Ashish Thomas
*Assistant Examiner* — Suman Rajaputra
(74) *Attorney, Agent, or Firm* — Konrad Raynes Davda & Victor LLP; Janaki K. Davda

(57) ABSTRACT

Provided are techniques for determining which target is most ahead in a multi-target mirroring environment between data from a consistent synchronous mirror copy operation and data from a consistent asynchronous mirror copy operation. It is determined that data is to be retrieved from one of a sync secondary storage of a sync secondary storage controller and an async secondary storage of an async secondary storage controller. Then, it is determined which one of data of a consistent synchronous mirror copy operation on the sync secondary storage and data of a consistent asynchronous mirror copy operation on the async secondary storage is a most current copy of the data. The most current copy of the data is retrieved and used for further processing.

24 Claims, 11 Drawing Sheets

(52) U.S. Cl.
CPC ........ *G06F 3/0689* (2013.01); *G06F 11/2058* (2013.01); *G06F 11/2064* (2013.01); *G06F 11/2074* (2013.01); *G06F 11/2076* (2013.01); *G06F 16/273* (2019.01); *G06F 16/275* (2019.01)

(56) References Cited

U.S. PATENT DOCUMENTS

| | | | |
|---|---|---|---|
| 9,697,226 B1 | 7/2017 | Youngworth | |
| 9,727,626 B2 | 8/2017 | Goldberg et al. | |
| 9,734,028 B2 | 8/2017 | Aizer et al. | |
| 10,496,489 B1 * | 12/2019 | Chen | G06F 3/065 |
| 10,534,796 B1 * | 1/2020 | Lieberman | G06F 16/184 |
| 2005/0038968 A1 * | 2/2005 | Iwamura | G06F 11/2069 |
| | | | 711/162 |
| 2005/0071586 A1 * | 3/2005 | Bartfai | G06F 12/0835 |
| | | | 711/162 |
| 2005/0240634 A1 * | 10/2005 | Iwamura | G06F 11/2064 |
| 2009/0313428 A1 | 12/2009 | De Jong | |
| 2016/0366218 A1 | 12/2016 | Cors et al. | |
| 2017/0161190 A1 | 6/2017 | Crawford et al. | |

OTHER PUBLICATIONS

P. Mell, et al., "The NIST Definition of Cloud Computing", NIST, US Department of Commerce, Special Publication 800-145, Sep. 2011, pp. 7.

* cited by examiner

DETERMINING WHICH TARGET IS MOST AHEAD IN A MULTI-TARGET MIRRORING ENVIRONMENT

BACKGROUND

1. Field of the Invention

Embodiments of the invention relate to determining which target is most ahead in a multi-target mirroring environment between data from a consistent synchronous mirror copy operation and data from a consistent asynchronous mirror copy operation.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems, which may be geographically dispersed. Thus, data from a host to be stored in the data storage system is typically directed to a primary system at a local site and then replicated to a secondary system, which may be geographically remote from the primary system.

The process of replicating, that is, copying data over to the secondary system may be set up in either a synchronous or an asynchronous relationship between the primary system and the secondary system. In a synchronous relationship, any updates to the primary system are typically synchronized with the secondary system, that is, successfully copied over to the secondary system, before the primary system reports to the host that the data storage input/output operation has been successfully completed. As a result, data storage to a primary storage system and a secondary system in a synchronous relationship may adversely affect system performance of the host while the host awaits completion of the synchronous copy operations. In storage systems in which the primary and secondary systems are widely separated, delays to completion of the synchronous copy operations may be greater, which can further adversely affect host performance. For example, in storage systems in which the primary system and the secondary system are separated by a geographical distance of 300 kilometers (Km) or more, for example, there can be a delay of 3-5 seconds (or more) before the data is successfully replicated at the secondary system.

Storage systems may employ an asynchronous relationship between a primary system and a secondary system, particularly if the secondary system is geographically distant from the primary system. In an asynchronous relationship, successful updates to the primary system are typically reported to the host as a successful storage input/output operation without waiting for the update to be replicated to the secondary system. As a result, the host need not wait for the data replication to the secondary system to be completed, and the performance of the host system may be enhanced accordingly.

As the name suggests, in an asynchronous relationship, the primary system and the secondary system may not be fully synchronized at any one time. Thus, data stored on the secondary system typically lags that stored in the primary system. Accordingly, new data stored on a primary system may not be stored on the secondary system for an interval of time such as 3-5 seconds, for example.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

A near instantaneous copy of a volume may be generated using a point-in-time copy function such as the IBM® FlashCopy® function, for example. (IBM and FlashCopy are registered trademarks or common law marks of International Business Machines Corporation in the United States and/or other countries.) The point-in-time copy function creates a "snapshot" of the contents of a source volume as of a particular point-in-time in a target volume which may be referred to as the point-in-time copy volume. One version of a point-in-time copy function transfers the contents of the source volume to the point-in-time copy volume in a background copy operation. The point-in-time copy function may also be referred to as a point-in-time snap copy function. A point-in-time copy may be described as a copy of the data consistent as of a particular point-in-time, and would not include updates to the data that occur after the point-in-time A point-in-time copy involves establishing a logical point-in-time copy relationship between source and target volumes on the same or different devices. The point-in-time copy guarantees that until a track in a point-in-time copy relationship has been hardened to its location on the target disk, the track resides on the source disk. A relationship table is used to maintain information on all existing point-in-time copy relationships in the subsystem. During the establish phase of a point-in-time copy relationship, one entry is recorded in the source relationship table for the source and in the target relationship table for the target that participate in the point-in-time being established. Each added entry maintains all the required information concerning the point-in-time copy relationship. Both entries for the relationship are removed from the relationship tables when all point-in-time tracks from the source extent have been physically copied to the target extents or when a withdraw command is received. In certain cases, even though all tracks have been copied from the source extent to the target extent, the relationship persists.

Once the logical relationship is established, hosts may then have immediate access to data on the source and target volumes, and the data may be copied as part of a background operation. A read to a track that is a target in a point-in-time copy relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the point-in-time copy. Further, any destages to tracks on the source device that have not been copied over triggers a destage intercept, which causes the tracks on the source device to be copied to the target device.

Another version of a point-in-time copy function omits the background copy operation. Thus, the contents of the source volume are not transferred to the point-in-time copy volume in a background copy operation but are transferred in response to an update of the source volume. Accordingly, any read operations directed to a track of the point-in-time copy volume are usually redirected to obtain the contents of that track from the source volume. However, if the host directs an update to a track of the source volume, the contents of the track of the source volume are transferred to the point-in-time copy volume before the update is permitted to overwrite the contents of that track of the source volume.

To maintain a degree of consistency of data across multiple volumes at a secondary system, a Peer-to-Peer Remote Copy (PPRC) function supports the concept of a PPRC consistency group. Volumes in a PPRC relationship that are configured into a PPRC consistency group are maintained to ensure that a group of updates made to volumes at the primary system are also eventually made on the volumes at the secondary system to maintain data consistency for those volumes of the group. Accordingly, consistency groups may be formed between volumes of the primary system and the secondary system which are consistent with respect to a particular set of updates or a particular point in time, notwithstanding the overall asynchronous relationship between the primary system and the secondary system.

One of the volumes of the primary system which may be in a consistency group with volumes at the secondary system, may itself be a target of a point-in-time copy as long as the point-in-time copy relationship is initiated prior to formation of the consistency group which includes the target volume of the point-in-time copy.

In some systems, there are two secondary systems coupled to one primary system. In such systems, if the primary system fails, one of the two secondary systems is selected for use in obtaining data for recovery at the primary system. Some conventional systems restart one of the secondary systems to determine the time-stamp from a systems perspective and then decide whether this system is the right choice for obtaining data to restore the primary system. However, this adds to the Run Time Objective (RTO) for the environment in this error scenario.

The RTO may be described as a total amount of time it takes to be completely recovered from a disaster (e.g., loss of the primary storage device). This includes bringing up hosts at the secondary system, reading the state of the secondary data in the secondary storage device, recovering/rebuilding any lost data, Initial Program Loading (IPLing or "booting" or "loading the operating system in main memory"), restarting applications, etc., until a business process is completely restored.

SUMMARY

Provided is a computer program product for determining which target is most ahead in a multi-target mirroring environment between data from a consistent synchronous mirror copy operation and data from a consistent asynchronous mirror copy operation. The computer program product comprises a computer readable storage medium having program code embodied therewith, the program code executable by at least one processor to perform: determining that data is to be retrieved from one of a sync secondary storage of a sync secondary storage controller and an async secondary storage of an async secondary storage controller; determining which one of data of a consistent synchronous mirror copy operation on the sync secondary storage and data of a consistent asynchronous mirror copy operation on the async secondary storage is a most current copy of the data; retrieving the most current copy of the data; and using the most current copy of the data for further processing.

Provided is a computer system for determining which target is most ahead in a multi-target mirroring environment between data from a consistent synchronous mirror copy operation and data from a consistent asynchronous mirror copy operation. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: determining that data is to be retrieved from one of a sync secondary storage of a sync secondary storage controller and an async secondary storage of an async secondary storage controller; determining which one of data of a consistent synchronous mirror copy operation on the sync secondary storage and data of a consistent asynchronous mirror copy operation on the async secondary storage is a most current copy of the data; retrieving the most current copy of the data; and using the most current copy of the data for further processing.

Provided is a computer-implemented method for determining which target is most ahead in a multi-target mirroring environment between data from a consistent synchronous mirror copy operation and data from a consistent asynchronous mirror copy operation. The computer-implemented method comprises: determining that data is to be retrieved from one of a sync secondary storage of a sync secondary storage controller and an async secondary storage of an async secondary storage controller; determining which one of data of a consistent synchronous mirror copy operation on the sync secondary storage and data of a consistent asynchronous mirror copy operation on the async secondary storage is a most current copy of the data; retrieving the most current copy of the data; and using the most current copy of the data for further processing.

Thus, embodiments advantageously determine a most ahead or most current copy of data in a multi-target mirroring environment. With embodiments, the multi-target mirroring environment includes one primary storage controller coupled to two secondary storage controllers. Data is copied synchronously form the primary storage controller to a sync secondary storage controller. Data is copied asynchronously from the primary storage controller to an async secondary storage controller. Then, when a host would like to know which target (i.e., the sync secondary storage controller or the async secondary storage controller) is most ahead in data updates (i.e., which one has the most current (recent) copy of data), embodiments advantageously determine whether the sync secondary storage controller or the async secondary storage controller is most ahead and uses the data of that storage controller to perform further processing, such as restoring a failed primary storage controller.

In certain embodiments, in response to determining that a consistent synchronous mirror copy relationship on a primary storage of a primary storage controller was in a duplex state at an end of a consistency group formation by the consistent synchronous mirror copy operation, it is determined that the data on the sync secondary storage is the most current copy of the data. Thus, certain embodiments advantageously use a state of a consistent synchronous mirror copy relationship on a primary storage of a primary storage controller at an end of a consistency group to identify the most current copy of the data.

In additional embodiments, in response to determining that a consistent synchronous mirror copy relationship on a primary storage of a primary storage controller was in a duplex state when a consistency group began to form by the consistent synchronous mirror copy operation, but was in a suspended state at an end of the consistency group formation by the consistent synchronous mirror copy operation, it is determined that the data on the sync secondary storage is the most current copy of the data. Thus, additional embodiments advantageously use states of a consistent synchronous mirror copy relationship on a primary storage of a primary storage controller when a consistency group began to form by the consistent synchronous mirror copy operation and at an end of the consistency group formation to identify the most current copy of the data.

In yet additional embodiments, in response to determining that a consistent synchronous mirror copy relationship on a primary storage of a primary storage controller was in a suspended state at both a start of a consistency group formation and at an end of the consistency group formation by the consistent synchronous mirror copy operation, it is determined that the data on the async secondary storage is the most current copy of the data. Thus, yet additional embodiments advantageously use states of a consistent synchronous mirror copy relationship on a primary storage of a primary storage controller at both a start of a consistency group formation and at an end of the consistency group formation to identify the most current copy of the data.

In other embodiments, in response to determining that a consistent synchronous mirror copy relationship on a primary storage of a primary storage controller is in a pending state, it is determined that the data on the async secondary storage is the most current copy of the data. Thus, other embodiments advantageously use states of a consistent synchronous mirror copy relationship on a primary storage of a primary storage controller at both a start of a consistency group formation and at an end of the consistency group formation to identify the most current copy of the data.

In yet other embodiments, in response to determining that a consistent synchronous mirror copy relationship moves to a duplex state while the consistent asynchronous mirror copy operation is draining a consistency group, a consistency group start state is updated to duplex. Thus, yet other embodiments advantageously update the state based on the consistent synchronous mirror copy relationship moving to a duplex state while the consistent asynchronous mirror copy operation is draining a consistency group to cover an additional scenario.

In further embodiments, at least one host, a primary storage controller, a primary storage, the sync secondary storage controller, the sync secondary storage, the async secondary storage controller, and the async secondary storage are in a cloud infrastructure. Thus, further embodiments advantageously enable using a cloud environment for determining which target is most ahead in a multi-target mirroring environment between data from a consistent synchronous mirror copy operation and data from a consistent asynchronous mirror copy operation.

In yet further embodiments, a Software as a Service (SaaS) is configured to perform computer program product operations. Thus, yet further embodiments advantageously enable providing a service in a cloud environment for determining which target is most ahead in a multi-target mirroring environment between data from a consistent synchronous mirror copy operation and data from a consistent asynchronous mirror copy operation

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments determine which target is most ahead in a multi-target mirroring environment between data from a consistent synchronous mirror copy operation and data from a consistent asynchronous mirror copy operation. With embodiments, the multi-target mirroring environment includes one primary storage controller coupled to two secondary storage controllers. Data is copied synchronously form the primary storage controller to a sync secondary storage controller. Data is copied asynchronously from the primary storage controller to an async secondary storage controller. Then, for example, when there is a failure of the primary storage controller, a host would like to know which target (i.e., the sync secondary storage controller or the async secondary storage controller) is most ahead in data updates (i.e., which one has the most current (recent) copy of data), embodiments advantageously determine whether the sync secondary storage controller or the async secondary storage controller is most ahead and uses the data of that storage controller to restore the primary storage controller.

Figure 1:
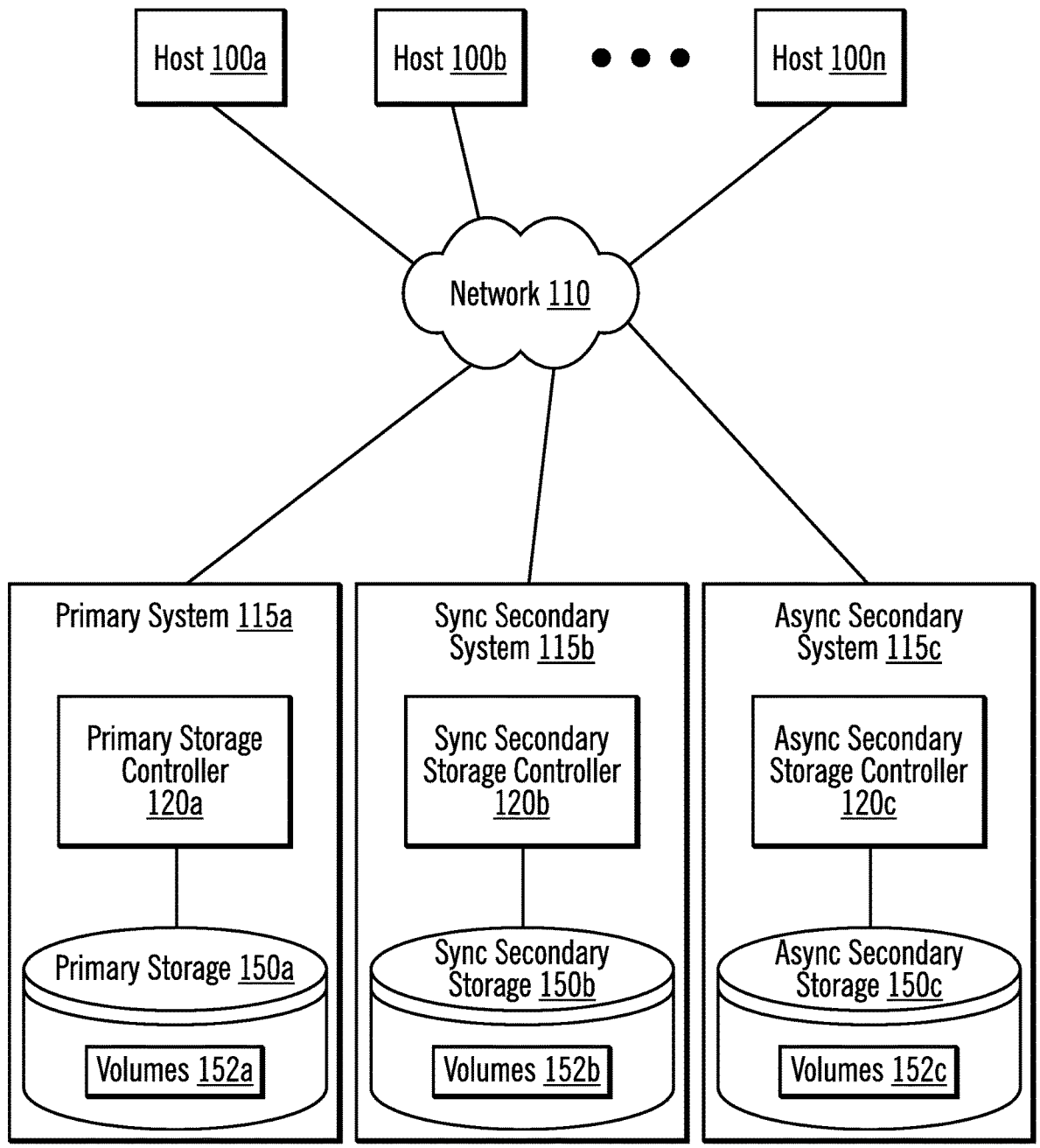
FIG. 1 illustrates, in a block diagram, a computing environment with a primary storage controller, a sync secondary storage controller, and an async secondary storage controller in accordance with certain embodiments.

FIG. 1 illustrates, in a block diagram, a computing environment with a primary storage controller 120a, a sync secondary storage controller 120b, and an async secondary storage controller 120c in accordance with certain embodiments. A plurality of hosts 100a, 100b, . . . 100n are coupled, via a network 110, to the primary storage controller 120a of a primary system 115a, to a sync secondary storage controller 120b of a sync secondary system 115b, and to an async secondary storage controller 120c of an async secondary system 115c. The plurality of hosts 100a, 100b, . . . 100n may submit Input/Output (I/O) requests to the storage controllers (or storage control units) 120a, 120b, 120c over the network 110 to access data at volumes 152a in primary storage 150a, volumes 152b in sync secondary storage 150b, and volumes 152c in async secondary storage 150c. The volumes may be, for example, Logical Unit Numbers, Logical Devices, Logical Subsystems, etc. The primary storage 150a, the sync secondary storage 150b, and the async secondary storage 150c may be storage drives.

In FIG. 1, the storage controller 120a and the storage 150a have been configured as a primary storage control unit and the primary storage, respectively, of a primary system 115a. The storage controller 120b and the data storage 150b have been configured as a sync secondary storage control unit and a sync secondary storage, respectively, of a sync secondary system 115b. The storage controller 120c and the data storage 150c have been configured as an async secondary storage control unit and an async secondary storage, respectively, of an async secondary system 115c.

In a particular copy relationship, the source unit is often referred to as the primary, and the target unit is often referred to as the secondary. Replication relationships are defined between storage units of the data storage 150a and 150b and between storage units of the data storage 150a and 150c. Notwithstanding a reference to the data storage 150a as "primary", the data storage 150b as "sync secondary," and the data storage 150c as "async secondary", particular storage units of the data storage 150a, 150b, 150c may play both a source role and a target role depending upon the particular copy relationship.

As noted above, the computing environment includes one or more hosts 100a, 100b, . . . 100n writing updates to the primary storage controller 120a for storage in the primary storage 150a.

With embodiments, the primary storage controller 120a is located at a first site, the sync secondary storage controller 120b is located at a second site, and the async secondary storage controller 120c is located at a third site. The first site, the second site, and the third site may be geographically or functionally remote from the each other. Thus, in such embodiments, the first site may be at a local site and the second and third sites may be at (the same or different) geographically remote sites separated by a short or long geographical distance from the local site and from each other. Alternatively, the local and remote site may be relatively close, such as in different buildings in the same general geographical location, in different rooms of the same building, in different machines in the same room, or in different portions or partitions of the same machine, of the network 110.

Thus, with embodiments, there are two secondary systems 115b, 115c coupled to one primary system 115a. If the primary system 115a fails, embodiments advantageously identify which one of the two secondary systems 115b, 115c is to be selected for use in obtaining data for recovery at the primary system 115a.

Figure 2:
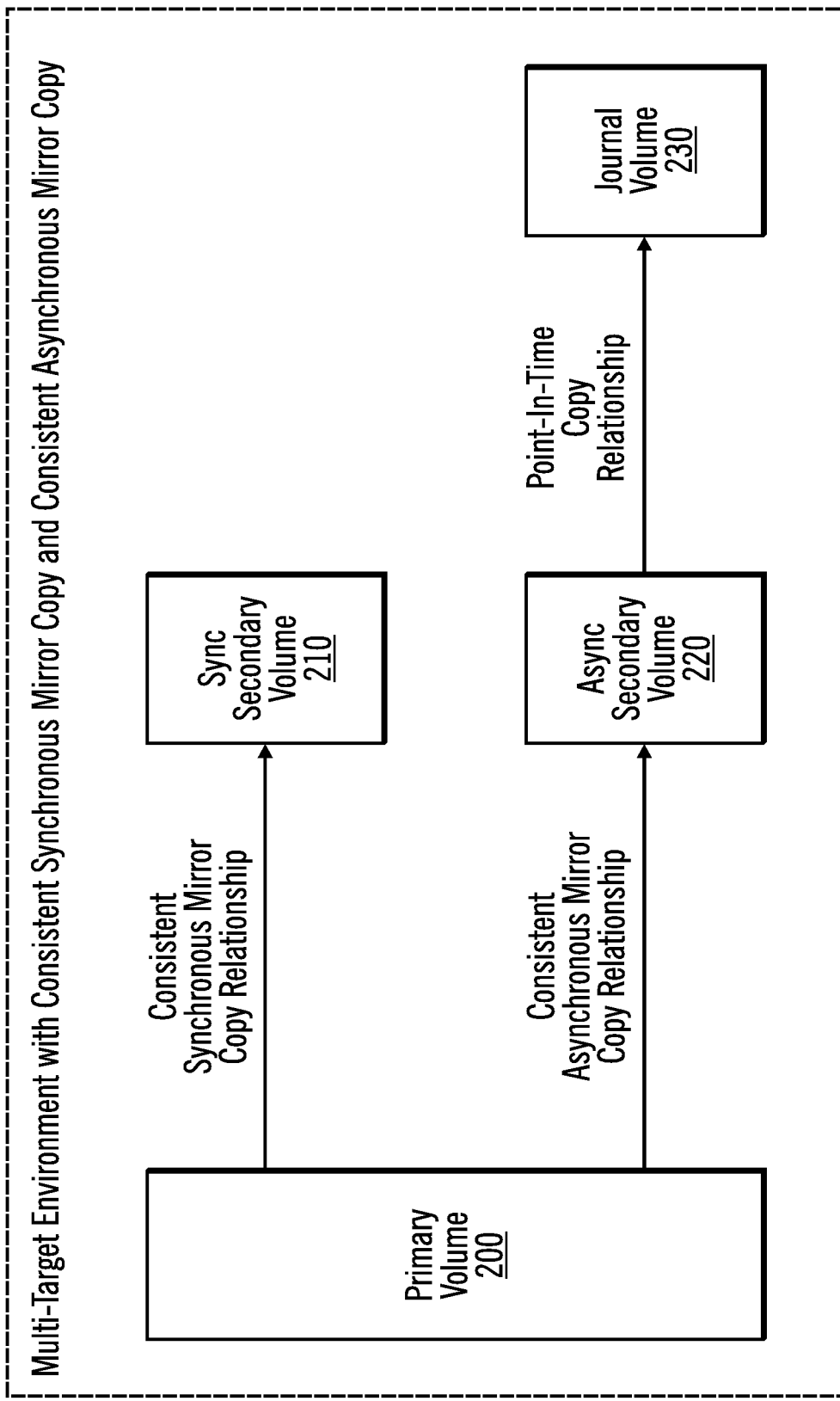
FIG. 2 illustrates, in a block diagram a multi-target environment with a consistent synchronous mirror copy and a consistent asynchronous mirror copy in accordance with certain embodiments.

FIG. 2 illustrates, in a block diagram a multi-target environment with a consistent synchronous mirror copy and a consistent asynchronous mirror copy in accordance with certain embodiments. In FIG. 2, the primary volume 200 is in a consistent synchronous mirror copy relationship with a sync secondary volume 210. That is, there is a consistent synchronous mirror copy operation from the primary volume 200 to the sync secondary volume 210. In addition, the primary volume 200 is in a consistent asynchronous mirror copy relationship with an async secondary volume 220. That is, there is a consistent asynchronous mirror copy operation from the primary volume 200 to the async secondary volume 220. In addition, there is a point-in-time copy relationship between the async secondary volume 220 and the journal volume 230 representing a point-in-time copy operation from the async secondary volume 220 to the journal volume 230.

Figure 3:
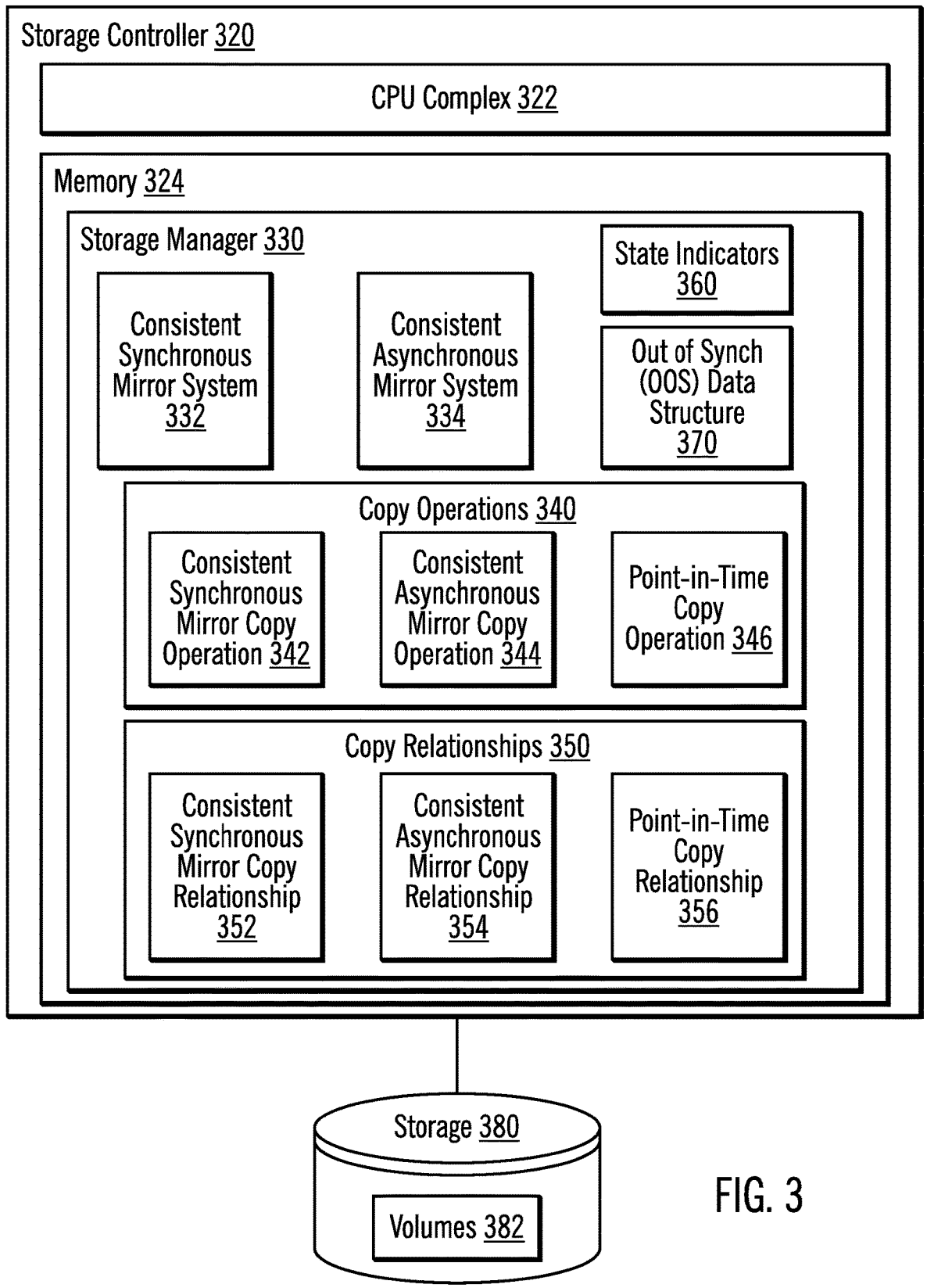
FIG. 3 illustrates, in a block diagram, further details of a storage controller in accordance with certain embodiments.

FIG. 3 illustrates, in a block diagram, further details of a storage controller 320 in accordance with certain embodiments. The primary storage controller 120a, the sync storage controller 120b, and the async secondary storage controller 120c may each include the components of storage controller 320.

The storage controller 320 includes a Central Processing Unit (CPU) complex 322 and a memory 324. The storage controller 320 is coupled to storage 380 having volumes 382.

The CPU complex 322 includes one or more processors or central processing units, each having a single or multiple processor cores. In certain embodiments, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

The memory 324 that includes a storage manager 330 for managing storage operations, including data replication operations from the storage 380 to another storage of another storage controller. If the storage controller 320 is a primary storage controller, then the storage 380 is primary storage. If the storage controller 320 is a sync secondary storage controller, then the storage 380 is a sync secondary storage. If the storage controller 320 is an async secondary storage controller, then the storage 380 is an async secondary storage.

The storage manager 330 includes a consistent synchronous mirror system 332, a consistent asynchronous mirror system 334, copy operations 340, copy relationships 350, state indicators 360, and an Out of Synch (OOS) data structure 370.

The copy operations 340 include a consistent synchronous mirror copy operation 342 (e.g., a metro mirror copy) performed by the consistent synchronous mirror system 332, a consistent asynchronous mirror copy operation 344 (e.g., a global copy) performed by the consistent asynchronous mirror system 334, and a point-in-time copy operation 346 initiated by the consistent asynchronous mirror system 334. The copy relationships 350 include a consistent synchronous mirror copy relationship 352 (for a consistent asynchronous mirror copy), an asynchronous mirror copy relationship 354

(for an asynchronous mirror copy), and a point-in-time copy relationship 356 (for a point-in-time copy). With embodiments, at any time, there may be one or more of each of the copy operations 340 and copy relationships 350.

With embodiments, the storage manager 330 is depicted as software stored in the memory 324 and executed by the CPU complex 322. However, it is appreciated that the logic functions of the storage manager 330 may be implemented as hardware, software, firmware or combinations of one or more thereof, depending upon the particular application.

The copy relationships 350 associate primary storage locations in the primary storage 150a and corresponding secondary storage locations in the sync secondary storage 150b and the async secondary storage 150c, such that updates by a host to the primary storage 150a locations are copied to the corresponding sync secondary storage 150b locations and the async secondary storage 150c locations. For example, source storage locations in a primary storage volume 1 of storage 150a may be mirrored in a data replication operation to target storage locations of the sync secondary volume of the sync secondary storage 150b and the async secondary volume of the async secondary storage 150c.

With embodiments, the consistent synchronous mirror copy relationship 352 is a Peer-to-Peer copy relationship for a pair of storage locations in which updates to the primary (source) storage locations are mirrored to the sync secondary (target) storage locations in a synchronous manner.

With embodiments, the consistent asynchronous mirror copy relationship 354 is a Peer-to-Peer relationship for a pair of storage locations in which updates to the primary (source) storage locations are mirrored to the async (target) storage locations in an asynchronous manner.

Volumes in a peer-to-peer relationship are configured into a consistency group to ensure that a group of updates made to volumes at the primary system are also eventually made on the volumes at the secondary system to maintain data consistency for those volumes of the group. Accordingly, consistency groups may be formed between volumes of the primary system and volumes of the sync secondary system. Also, consistency groups may be formed between volumes of the primary system and volumes of the async secondary system. Such consistency groups are consistent with respect to a particular set of updates or a particular point in time, notwithstanding the overall synchronous or asynchronous relationship between the primary system and the secondary system.

The storage manager 332 accesses updates to the primary storage 150a to write to the corresponding storage locations in the storage 150b or 150c. In some applications, the copying and relationship functions may be performed by devices external to the storage systems 115a, 115b, 115c, such as the hosts, for example. With the consistent synchronous mirror system 332, the I/O operation insofar as the host initiating the operation is concerned, is considered to be complete upon data transfer to the sync secondary storage 150b. On the other hand, with the consistent asynchronous mirror system 334, the I/O operation insofar as the host initiating the operation is concerned, is considered to be complete upon successful write of the update to the primary storage 150a. Accordingly, the host may be notified that the I/O operation was successfully completed notwithstanding that the update data has not yet been mirrored to the async secondary storage 150c. Due to the asynchronous nature of the consistent asynchronous mirror copy operation, data stored on the async secondary storage typically lags that stored in the primary storage (e.g., by 3-5 seconds).

Thus, in contrast to the asynchronous mode, in a synchronous mode, an I/O operation which performed a write operation to the primary storage 150a is not considered complete until the mirror operation is completed, that is, it is not complete until the update data has been successfully replicated to the sync secondary storage 150b. Should the mirror operation fail such that the update is not successfully mirrored to the sync secondary storage 150b, the host may be notified that the update operation was not successfully completed. Due to the synchronous nature of the consistent synchronous mirror copy operation, data stored on the sync secondary storage does not lag that stored in the primary storage (e.g., by 3-5 seconds).

The storage manager 332 may transfer data from the primary storage 150a to the sync secondary storage 150b or to the async secondary storage 150b in tracks. As used herein, the term track may refer to a track of a disk storage unit, but may also reference to other units of data (or data units) configured in the storage 150a, 150b, 150c, such as a bit, byte, word, segment, page, block (such as a Logical Block Address (LBA)), etc., which may be a part of a larger grouping of data units, such as those stored collectively as a volume, logical device, etc. of data.

In one embodiment, the storage devices 150a, 150b, 150c may be comprised of one or more sequential access storage devices, such as hard disk drives and magnetic tape or may include non-sequential access storage devices such as solid state drives (SSD), for example. Each storage device 150a, 150b, 150c may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

Furthermore, as used herein, the term "unit of storage" or "storage unit" refers to a storage location containing one or more units of data storage capable of storing one or more data units such as one or more volumes, cylinders, tracks, segments, extents, or any portion thereof, or other unit or units of data suitable for transfer. Thus, a source storage unit and the associated target storage unit may each be a storage volume. However, it is appreciated that a source storage unit and a target storage unit may each be of a size other than a volume, for example.

The system components 100a, 100b, . . . 100n, 120a, 120b, 120c, 150a, 150b, 150c are connected to the network 110, which enables communication among these components. Thus, the network 110 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 100a, 100b, 100n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

The state indicators 360 are used to store states of the consistent synchronous mirror copy relationship 352 when the consistent synchronous mirror copy operation started to form a consistency group and when the consistent synchronous mirror copy operation completed forming the consistency group. Thus, there are two sets of states for each consistent synchronous mirror copy operation. The states include: duplex, suspended, pending, and simplex.

In duplex state, the data on the primary storage and the sync secondary storage are equal (i.e., the data has been copied to the synch secondary storage from the primary storage), and any new I/O writes to the primary storage are mirrored to the sync secondary storage in a synchronous manner (i.e., update the sync secondary storage before notifying host. This is the steady state of a consistent synchronous mirror copy operation 342.

In suspended state, mirroring between the primary and secondary has stopped (usually due to some network error). Any new I/O writes to the primary storage are simply marked in an Out of Synch (OOS) data structure (e.g., a bitmap) for transfer at a later time (e.g., when a path is fixed) to the synch secondary storage. In this case, the data on the sync secondary storage may lag (i.e., be older or staler than) that on the primary storage. The OOS data structure has an indicator for each storage location of the sync secondary storage. The OOS data structure is used to determine which tracks on the primary storage are out of sync with the sync secondary storage. For example, the indicators may be set to one value (e.g., 1) to indicate that data needs to be copied from the primary storage to the corresponding storage location on the sync secondary storage. Similarly, indicators may be set to another value (e.g., 0) to indicate that data does not need to be copied from the primary storage to the corresponding storage location on the sync secondary storage. Indicators of the OOS data structure are cleared (e.g., set to 0) as data is copied ito the corresponding storage locations of the sync secondary storage.

In the pending state, the primary storage and the sync secondary storage are out of sync, but the primary storage is copying data to the sync secondary storage. This is the state after resuming a suspended pair. Once all the data in the OOS data structure has been transferred to the sync secondary storage, then the state transitions from pending state to duplex state for the consistent synchronous mirror copy operation. This is the steady state for the consistent asynchronous mirror copy operation.

In simplex state, there is no mirroring relationship between a primary volume on the primary storage and another volume on the sync secondary storage.

Figure 4:
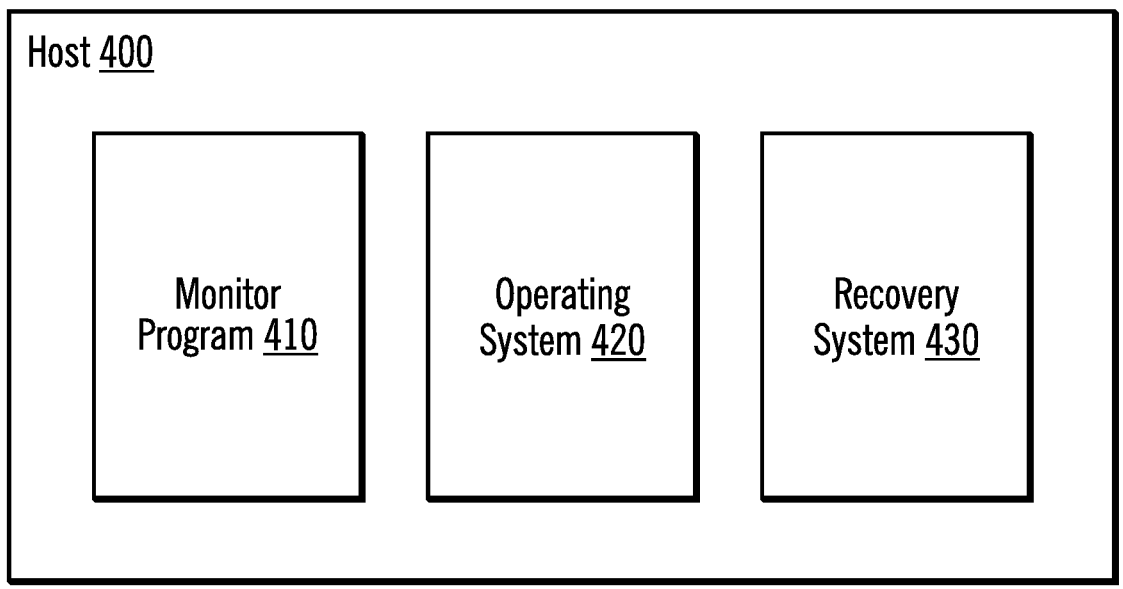
FIG. 4 illustrates, in a block diagram, further details of a host in accordance with certain embodiments.

FIG. 4 illustrates, in a block diagram, further details of a host 400 in accordance with certain embodiments. Each of the hosts 100a, 100b, . . . 100n may each include the components of host 400. Host 400 includes a monitor program 410, an operating system 420, an application 430. The monitor program 410 monitors failures in the availability of the primary storage controller 120a and the primary storage 150a. In some embodiments, the monitor program 410 may be operated in a device apart from the hosts. A host 400 that includes the monitor program 410 may omit update writing applications 430 in some embodiments. The application 430 reads data from and writes updates to a storage controller 120a, 120b, 120c, respectively, to, the primary storage 150a, the sync secondary storage 150b or the async secondary storage 150c. In certain embodiments, the monitor program 140 is a Geographically Dispersed Parallel Sysplex (GDPS) software (that manages replication on a mainframe) or a Copy Services Manager (CSM). The monitor program 410 determines whether to obtain data from the sync secondary storage or the async secondary storage.

Figure 5:
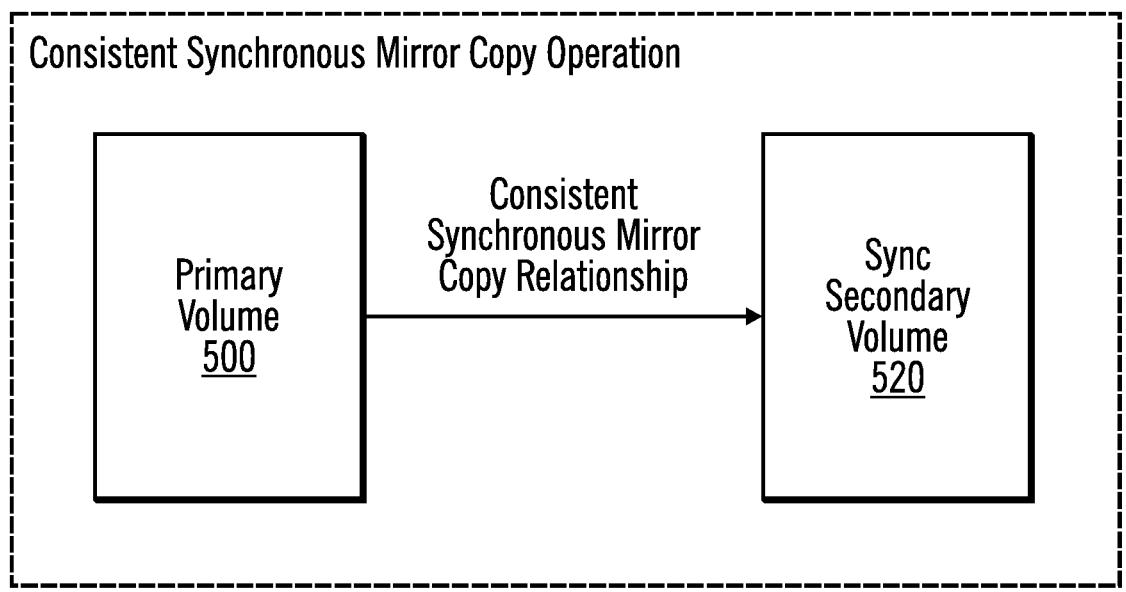
FIG. 5 illustrates, in a block diagram, further details of consistent synchronous mirror copy operation in accordance with certain embodiments.

FIG. 5 illustrates, in a block diagram, further details of consistent synchronous mirror copy operation in accordance with certain embodiments. The volumes of FIG. 5 are stored in storage devices. In FIG. 5, a primary volume 500 is in a consistent synchronous mirror copy relationship with a sync secondary volume 520. In certain embodiments, with the consistent synchronous mirror copy operation 342, a synchronous mirror copy is initiated from the primary volume to the sync secondary volume. As each write comes in to the primary storage to update data, the updated data is transferred to the sync secondary volume.

Figure 6:
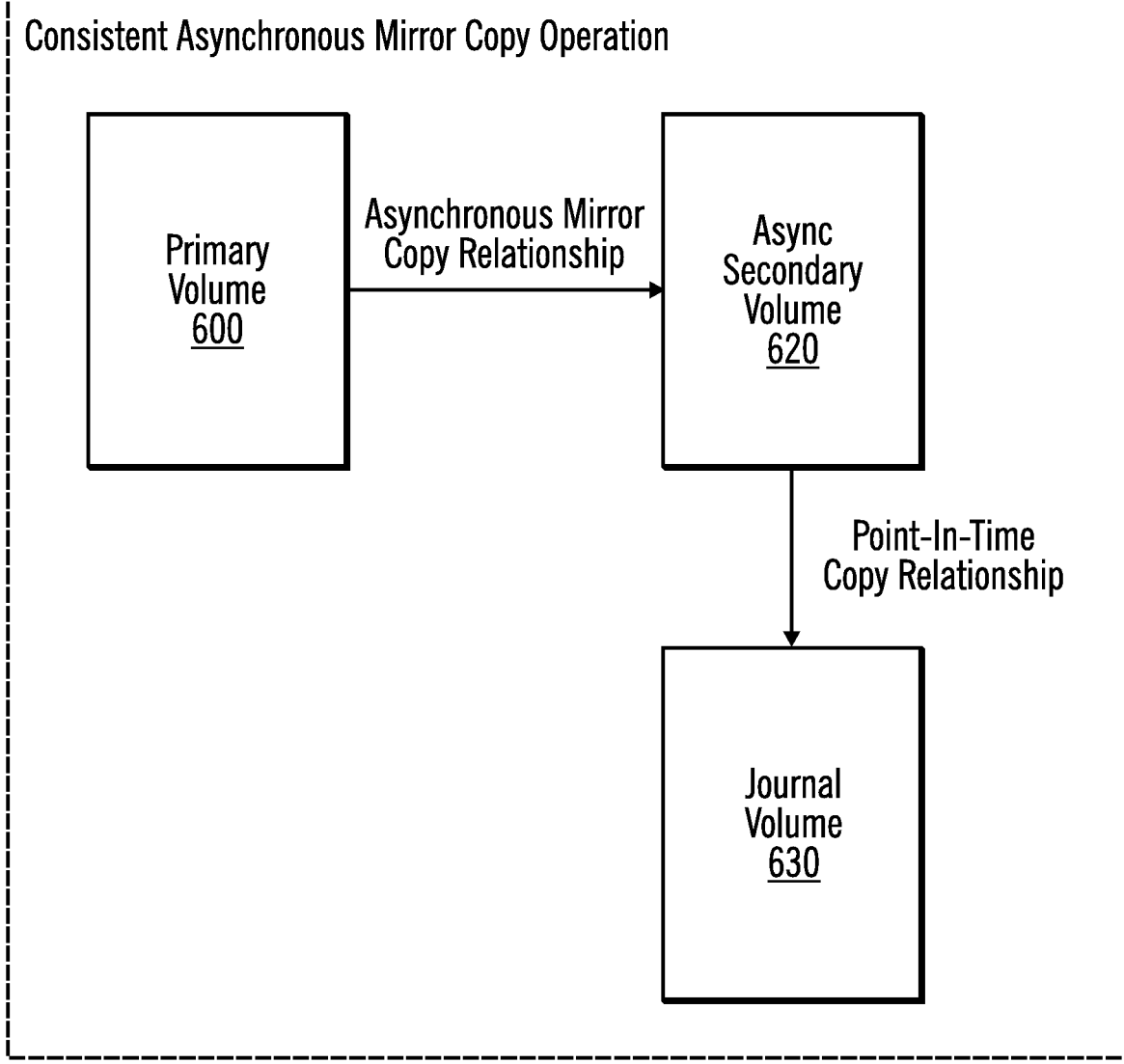
FIG. 6 illustrates, in a block diagram, further details of consistent asynchronous mirror copy operation in accordance with certain embodiments.

FIG. 6 illustrates, in a block diagram, further details of consistent asynchronous mirror copy operation in accordance with certain embodiments. The volumes of FIG. 6 are stored in storage devices. A primary volume 600 is in an asynchronous mirror copy relationship with an async secondary volume 620. Also, a point-in-time copy has been made from the async secondary volume 620 to a journal volume 630. The volumes 600, 620, and 630 are in a consistent asynchronous mirror copy relationship. The volumes 600 and 620 are in an asynchronous mirror copy relationship. The volumes 620 and 630 are in a point-in-time copy relationship.

In certain embodiments, with the consistent asynchronous mirror copy operation 344, an asynchronous mirror copy is initiated from the primary volume to the async secondary volume. This results in: a momentary pause of application writes (e.g., fraction of millisecond to few milliseconds), creation of a point-in-time consistency group, with new updates being saved. Then, application writes are restarted, with a complete write (drain) of point-in-time consistent data to the async secondary volume that is stopped after all consistent data has been copied to the async secondary volume. Next, there is a point-in-time copy operation 346 to the journal volume that occurs periodically. With embodiments, every time a consistency group (CG) is formed, the consistent asynchronous mirror copy operation 344 commits.

Figure 7:
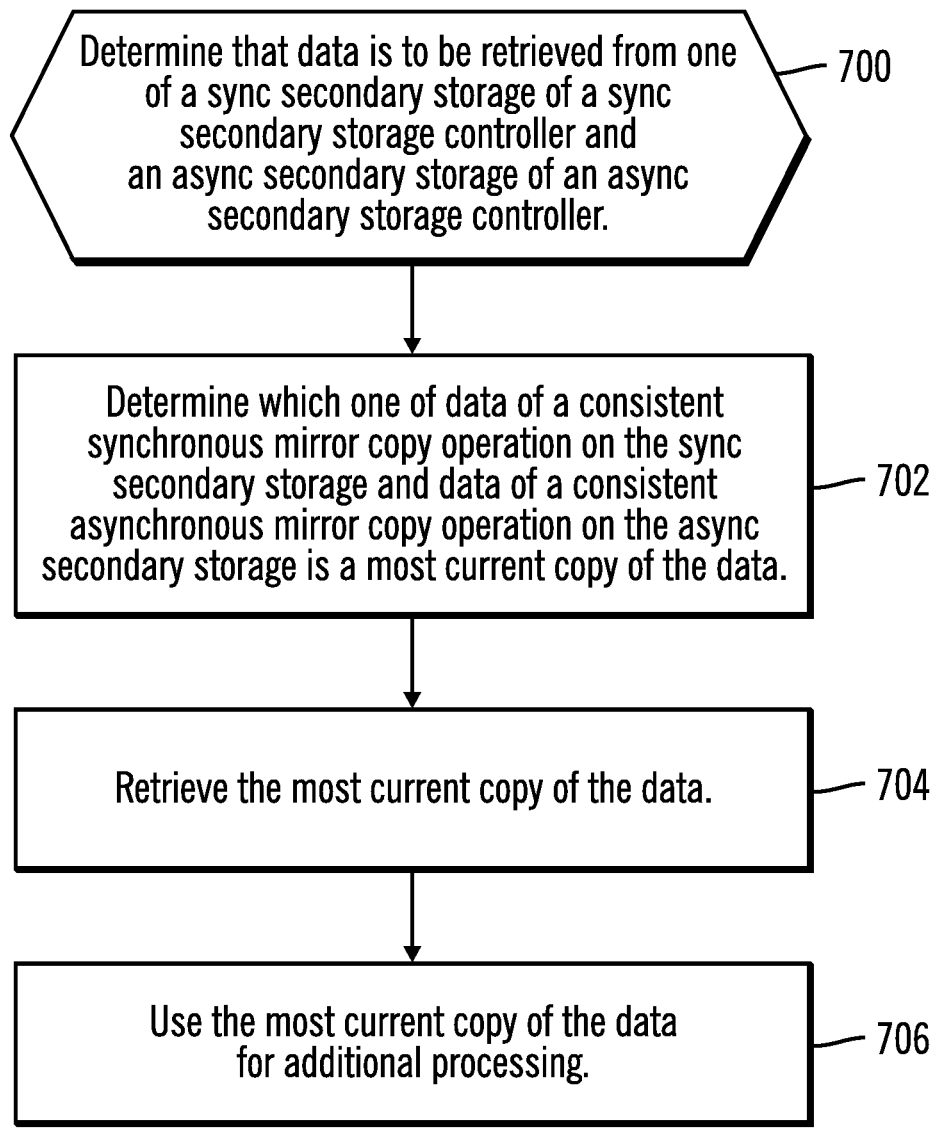
FIG. 7 illustrates, in a flowchart, operations for determining which target is most ahead in a multi-target mirroring environment between a consistent synchronous mirror copy operation and a consistent asynchronous mirror copy operation in accordance with certain embodiments.

FIG. 7 illustrates, in a flowchart, operations for determining which target is most ahead in a multi-target mirroring environment between data of a consistent synchronous mirror copy operation and data of a consistent asynchronous mirror copy operation in accordance with certain embodiments. Control begins at block 700 with the monitor program 410 determining that data is to be retrieved from one of a sync secondary storage of a sync secondary storage controller and an async secondary storage of an async secondary storage controller. In certain embodiments, the data is retrieved for disaster recovery of the primary storage at the primary storage controller. In other embodiments, the data is retrieved for performing analysis on the data in. In yet other embodiments, the data is retrieved for a testing scenario.

In block 702, the monitor program 410 determines which one of data of a consistent synchronous mirror copy operation on a sync secondary storage of a sync secondary storage controller and data of a consistent asynchronous mirror copy operation on an async secondary storage of an async secondary storage controller is a most current (i.e., a most recently updated) copy of data. In block 704, the monitor program 410 retrieves the most current copy of the data. In block 706, the monitor program 410 uses the most current copy of the data for further processing (e.g., for recovery at the primary storage controller, for performing analysis or for a test scenario).

Embodiments check the state of the consistent synchronous mirror copy relationship at two key points of the consistency group formation of the consistent asynchronous mirror copy operation and include that information as part of the consistent asynchronous mirror copy operation commit. Using this new state information, CSM and GDPS are able to quickly and easily identify which of the two secondary storages contains the most recent copy of the data.

In certain embodiments, if the consistent synchronous mirror copy operation is in a suspended state prior to the failure of the primary storage, then the data on the async secondary storage is more ahead than the sync secondary storage.

Embodiments understand whether the consistent synchronous mirror copy relationship on the primary storage was in duplex state at the time the consistent synchronous mirror copy operation started to form a consistency group and whether the consistent synchronous mirror copy relationship was duplex state when the consistency group was completed. Embodiments define the following rules:

1. If the consistent synchronous mirror copy relationship on the primary storage was in a duplex state at the end of the consistency group formation by the consistent synchronous mirror copy operation, then the data on the sync secondary storage of the consistent synchronous mirror copy operation is the most current copy of the data.

2. If the consistent synchronous mirror copy relationship on the primary storage was in duplex state when the consistency group began to form by the consistent synchronous mirror copy operation, but in suspended state at the end of the consistency group formation by the consistent synchronous mirror copy operation, then the data on the sync secondary storage of the consistent synchronous mirror copy operation is the most current copy of the data.

3. If the consistent synchronous mirror copy relationship on the primary storage was in suspended state at both the start and the end of consistency group formation by the consistent synchronous mirror copy operation, then the data on the async secondary storage is the most current copy of the data.

4. If the consistent synchronous mirror copy relationship on the primary storage is in pending state, then the data on the sync secondary storage is unusable, and the data on the async secondary storage is the most current copy of the data.

With embodiments, the consistent asynchronous mirror copy operation stores information about the state of each consistent synchronous mirror copy relationship between the primary storage and the sync secondary storage as part of the consistent asynchronous mirror copy operation subordinate information when the consistency group is formed by the consistent synchronous mirror copy. In addition, the consistent asynchronous mirror copy operation checks the state again when the consistency group is committed by the consistent synchronous mirror copy.

With embodiments, this information is passed to the async secondary storage when a point-in-time copy operation is performed to complete the consistency group for the consistent asynchronous mirror copy. For example, when the consistent asynchronous mirror copy operation forms the consistency group, it hardens the consistency group using the point-in-time copy operation from the async secondary storage to the journal storage. In certain embodiments, the primary storage controller may send an inband command to the async secondary storage controller to perform the point-in-time copy). This inband command includes the state of the consistent synchronous mirror copy relationship.

With embodiments, the state indicators 360 (e.g., additional flags) are provided for a point-in-time query to indicate the state of the consistent asynchronous mirror copy relationship at the start and end of the consistency group formation.

With embodiments, the monitor program 410 at the host may issue a query for the state indicators 360. Then, the rules discussed above are used by the monitor program 410 to determine which replication has the latest copy of the data (i.e., the data on the sync secondary storage or the async secondary storage). If rules (1) or (2) are matched, then the host recommends using the data on the sync secondary storage. If rules (3) or (4) are matched, then the host recommends using the data on the async secondary storage.

Embodiments Also Handle the Following Case:

1. The consistent synchronous mirror copy relationship is in suspended state

2. The consistent asynchronous mirror copy operation begins to form a consistency group and marks the state of the consistent synchronous mirror copy relationship as suspended.

3. The consistent synchronous mirror copy relationship moves to pending state

4. The consistent synchronous mirror copy relationship moves to duplex state

5. The consistent synchronous mirror copy relationship moves to suspended state

6. The consistent asynchronous mirror copy operation forms the consistency group and marks the state of the consistent synchronous mirror copy relationship as suspended.

In this example case, rule (3) applies, even though the consistent synchronous mirror copy of data is actually ahead. Therefore, embodiments add an additional rule of:

A. If the consistent synchronous mirror copy relationship moves to a duplex state while the consistent asynchronous mirror copy operation is draining a consistency group, then update the consistency group start state to duplex.

Thus, embodiments may have a new state included in the state indicators 360 in which the consistent synchronous mirror copy relationship was in duplex state during the consistent asynchronous mirror copy operation drain.

Figure 8:
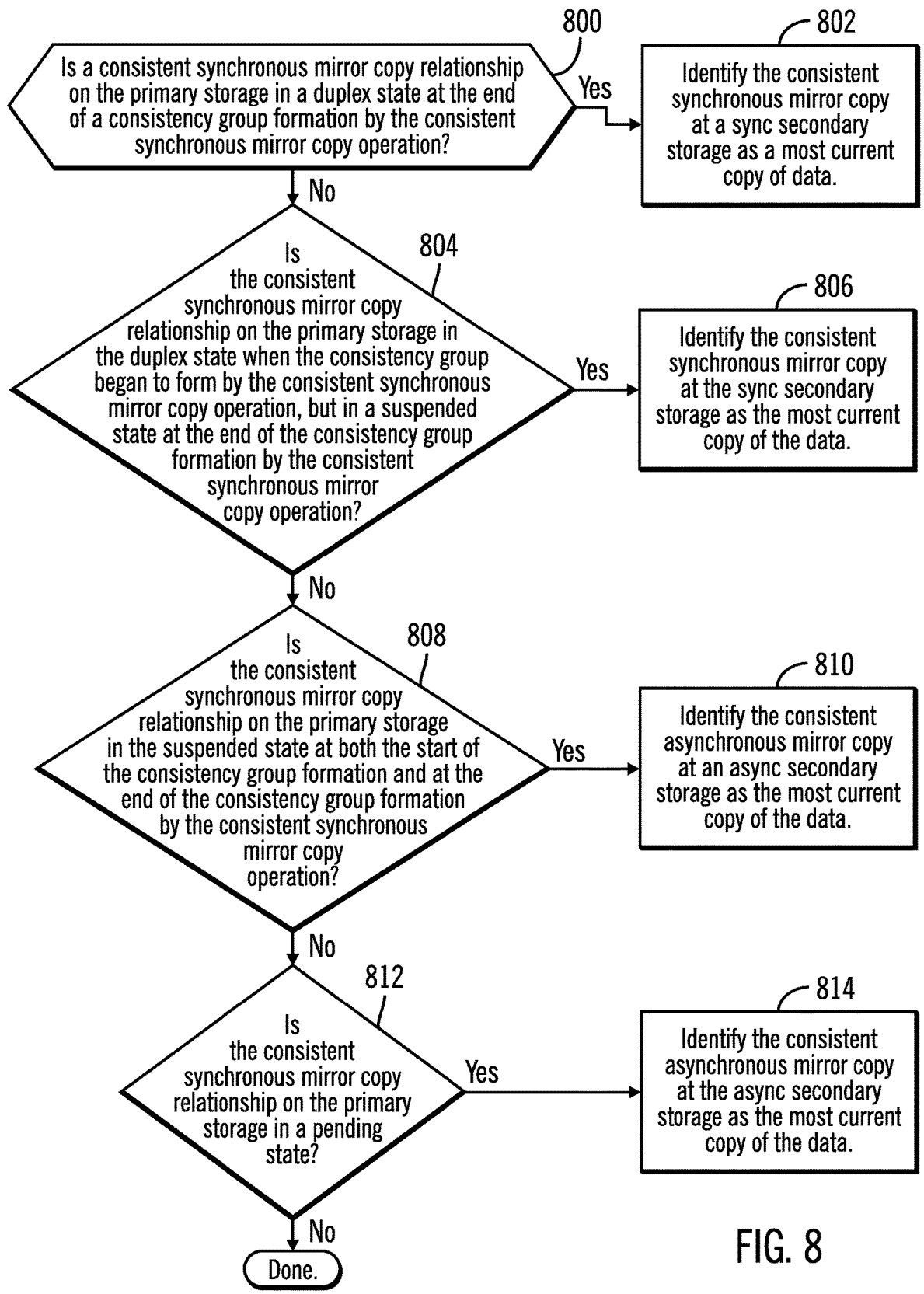
FIG. 8 illustrates, in a flowchart, operations for identifying one of a consistent synchronous mirror copy and a consistent asynchronous mirror copy as a most current operation in accordance with certain embodiments.

FIG. 8 illustrates, in a flowchart, operations for identifying one of a consistent synchronous mirror copy and a consistent asynchronous mirror copy as a most current (i.e., most recently updated) copy of data in accordance with certain embodiments. Control begins at block 800 with the monitor program 410 determining whether a consistent synchronous mirror copy relationship on the primary storage is in a duplex state at the end of a consistency group formation by the consistent synchronous mirror copy operation. This may be done by checking the state indicators 360. If so, processing continues to block 802, otherwise, processing continues to block 804.

In block 802, the monitor program 410 identifies a consistent synchronous mirror copy at a sync secondary storage controller as a most current copy of data.

In block 804, the monitor program 410 determines whether the consistent synchronous mirror copy relationship on the primary storage is in the duplex state when the consistency group began to form by the consistent synchronous mirror copy operation, but in a suspended state at the end of the consistency group formation by the consistent synchronous mirror copy operation. This may be done by checking the state indicators 360. If so, processing continues to block 806, otherwise, processing continues to block 808.

In block 806, the monitor program 410 identifies the consistent synchronous mirror copy at the sync secondary storage as the most current copy of the data.

In block 808, the monitor program 410 determines whether the consistent synchronous mirror copy relationship on the primary storage is in the suspended state at both the start of the consistency group formation and at the end of the consistency group formation by the consistent synchronous mirror copy operation. This may be done by checking the state indicators 360. If so, processing continues to block 810, otherwise, processing continues to block 812.

In block 810, the monitor program 410 identifies a consistent asynchronous mirror copy at an async secondary storage as the most current copy of the data.

In block 812, the monitor program 410 determines whether the consistent synchronous mirror copy relationship on the primary storage is in a pending state. This may be done by checking the state indicators 360. If so, processing continues to block 814, otherwise, processing is done for selecting the most current copy of the data.

In block 814, the monitor program 410 identifies a consistent asynchronous mirror copy at the async secondary storage as the most current copy of the data.

Figure 9:
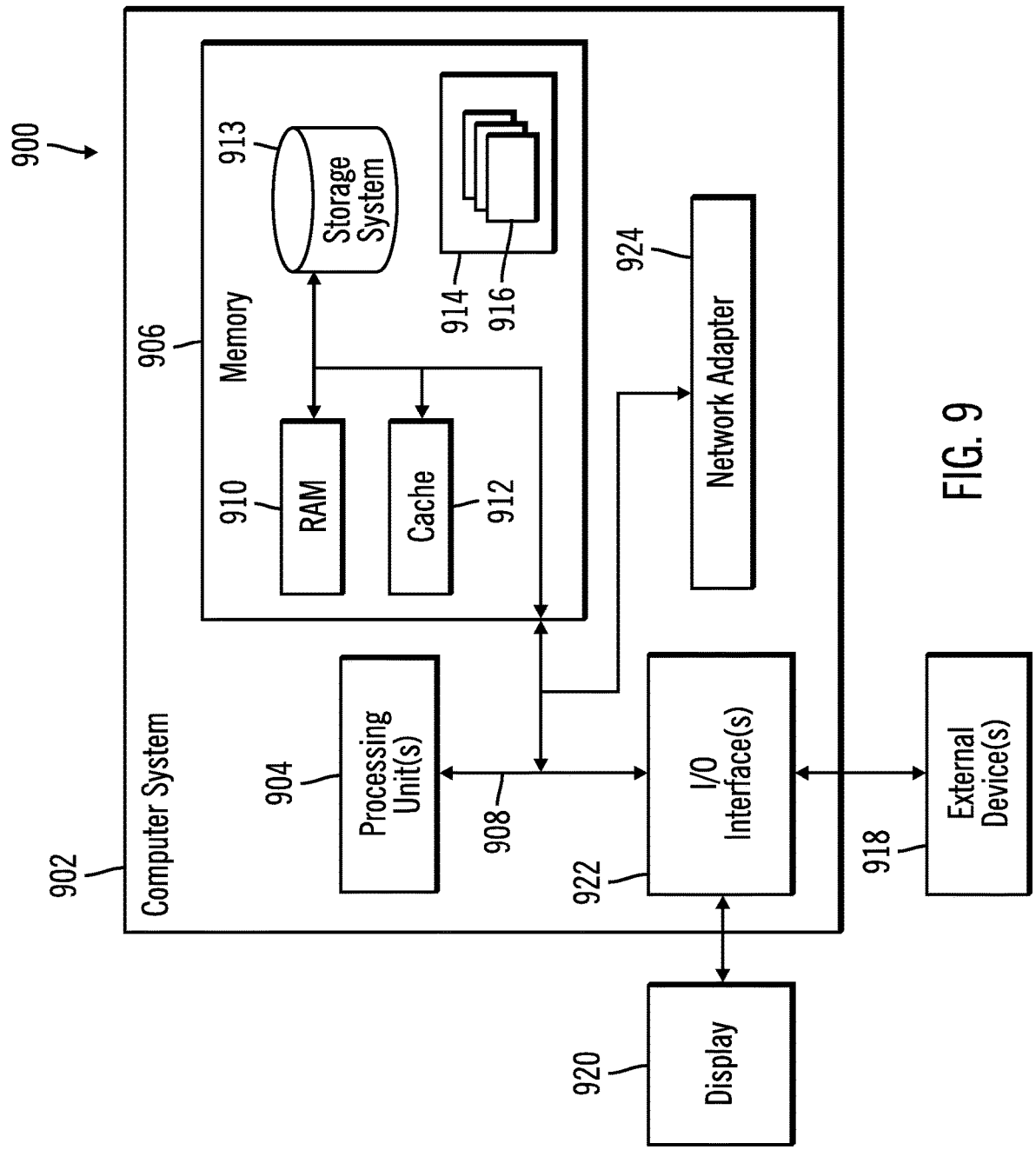
FIG. 9 illustrates a computing architecture in which the components of FIG. 1 may be implemented in accordance with certain embodiments.

FIG. 9 illustrates a computing architecture in which the components of FIG. 1 may be implemented in accordance with certain embodiments. In certain embodiments, the hosts 100a, 100b, . . . 100n and the storage controllers 120a, 120b, 220 may implement computer architecture 900.

Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 911 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where, if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
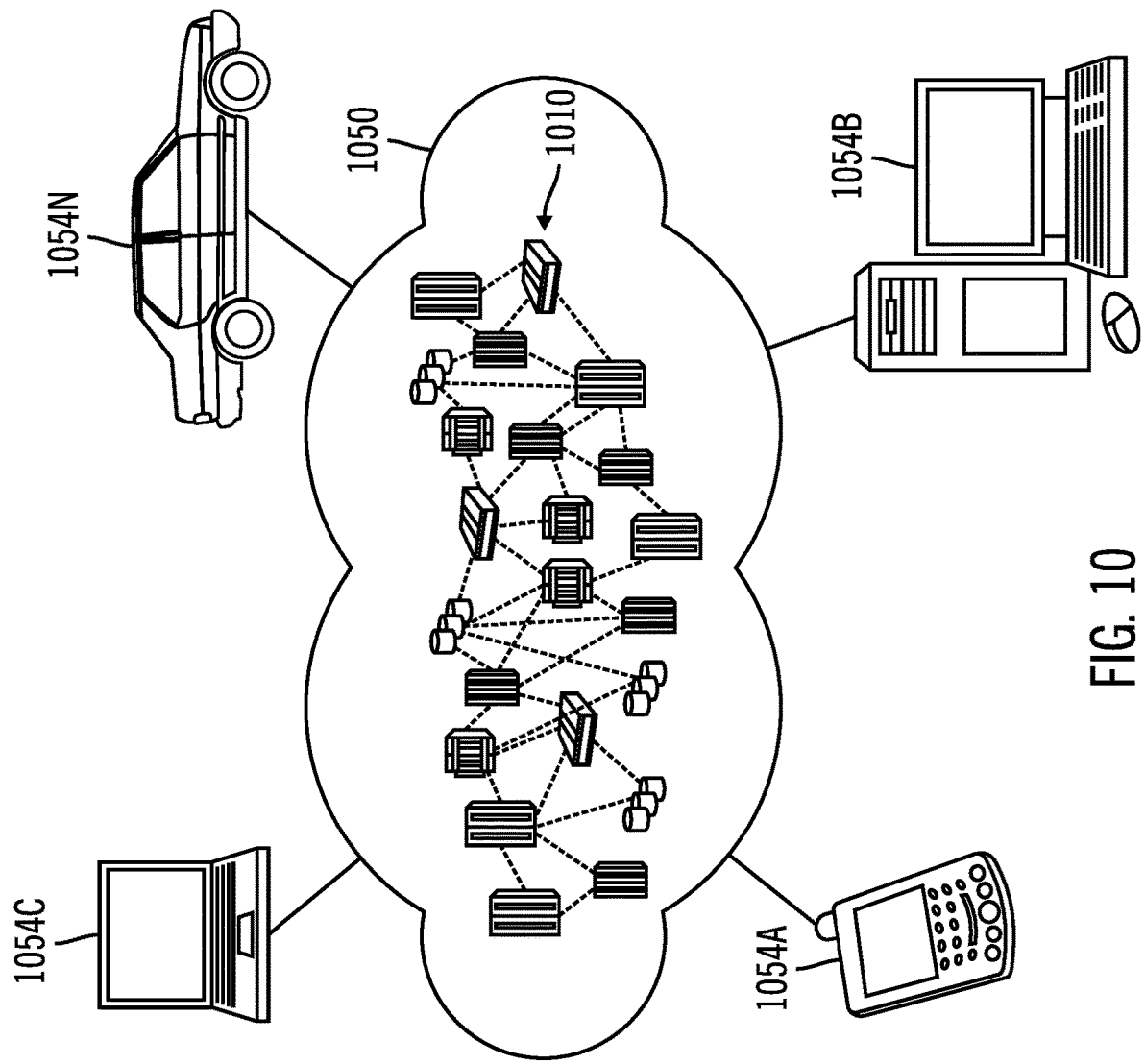
FIG. 10 illustrates a cloud computing environment in accordance with certain embodiments.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
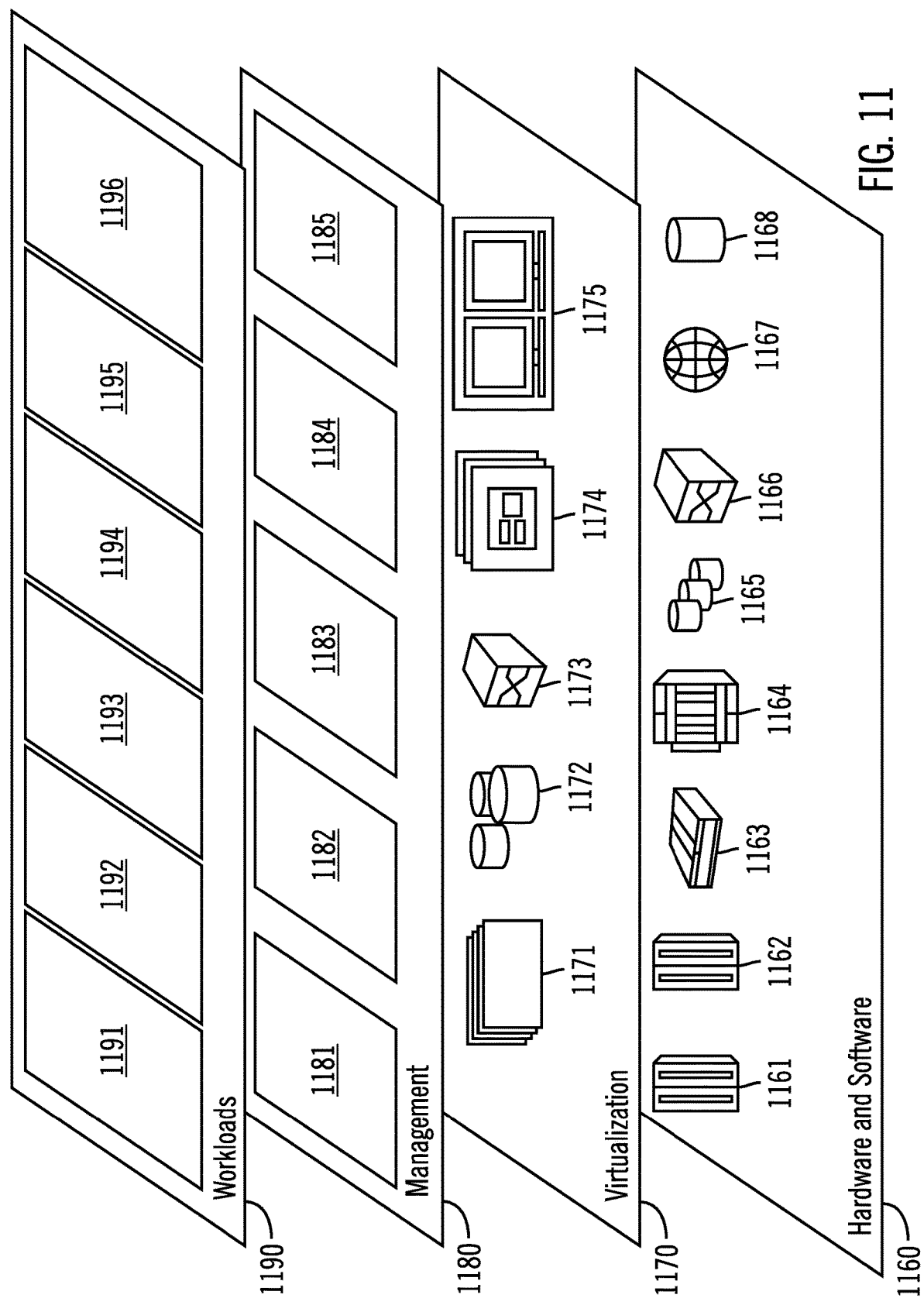
FIG. 11 illustrates abstraction model layers in accordance with certain embodiments.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and determining which target is most ahead in a multi-target mirroring environment between data from a consistent synchronous mirror copy operation and data from a consistent asynchronous mirror copy operation 1196.

Thus, in certain embodiments, software or a program, implementing determination of which target is most ahead in a multi-target mirroring environment between data from a consistent synchronous mirror copy operation and data from a consistent asynchronous mirror copy operation in accordance with embodiments described herein, is provided as a service in a cloud infrastructure.

In certain embodiments, the components of FIG. 1 are part of a cloud infrastructure. In other embodiments, the components of FIG. 1 are not part of a cloud infrastructure.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
    initiating a consistent synchronous mirror copy operation to copy data from a primary storage to a sync secondary storage;
    initiating a consistent asynchronous mirror copy operation comprising an asynchronous mirror copy operation to copy the data from the primary storage to an async secondary storage and a point-in-time copy operation to copy data from the async secondary storage to a journal storage;
    determining which one of data of the consistent synchronous mirror copy operation on the sync secondary storage and data of the consistent asynchronous mirror copy operation on the async secondary storage is a most current copy of the data based on selection from a group consisting of: a state of a consistent synchronous mirror copy relationship of the consistent synchronous mirror copy operation and whether the consistent synchronous mirror copy operation is at a start of a consistency group formation and is at an end of the consistency group formation;
    retrieving the most current copy of the data; and
    using the most current copy of the data for further processing.

2. The computer program product of claim 1, wherein the program code is executable by the at least one processor to perform further operations for:
    in response to determining that the consistent synchronous mirror copy relationship was in a duplex state at the end of the consistency group formation by the consistent synchronous mirror copy operation, determining that the data on the sync secondary storage is the most current copy of the data.

3. The computer program product of claim 1, wherein the program code is executable by the at least one processor to perform further operations for:
    in response to determining that the consistent synchronous mirror copy relationship was in a duplex state when a consistency group began to form by the consistent synchronous mirror copy operation, but was in a suspended state at the end of the consistency group formation by the consistent synchronous mirror copy operation, determining that the data on the sync secondary storage is the most current copy of the data.

4. The computer program product of claim 1, wherein the program code is executable by the at least one processor to perform further operations for:
  in response to determining that the consistent synchronous mirror copy relationship was in a suspended state at both the start of the consistency group formation and at the end of the consistency group formation by the consistent synchronous mirror copy operation, determining that the data on the async secondary storage is the most current copy of the data.

5. The computer program product of claim 1, wherein the program code is executable by the at least one processor to perform further operations for:
  in response to determining that the consistent synchronous mirror copy relationship is in a pending state, determining that the data on the async secondary storage is the most current copy of the data.

6. The computer program product of claim 1, wherein the program code is executable by the at least one processor to perform further operations for:
  in response to determining that the consistent synchronous mirror copy relationship moves to a duplex state while the consistent asynchronous mirror copy operation is draining a consistency group, updating a consistency group start state to duplex.

7. The computer program product of claim 1, wherein at least one host, a primary storage controller, the primary storage, a sync secondary storage controller, the sync secondary storage, an async secondary storage controller, and the async secondary storage are in a cloud infrastructure.

8. The computer program product of claim 1, wherein a Software as a Service (SaaS) is configured to perform the operations of the computer program product.

9. A computer system, comprising:
  one or more processors, one or more computer-readable memories and one or more computer-readable, tangible storage devices; and
  program instructions, stored on at least one of the one or more computer-readable, tangible storage devices for execution by at least one of the one or more processors via at least one of the one or more memories, to perform operations comprising:
  initiating a consistent synchronous mirror copy operation to copy data from a primary storage to a sync secondary storage;
  initiating a consistent asynchronous mirror copy operation comprising an asynchronous mirror copy operation to copy the data from the primary storage to an async secondary storage and a point-in-time copy operation to copy data from the async secondary storage to a journal storage;
  determining which one of data of the consistent synchronous mirror copy operation on the sync secondary storage and data of the consistent asynchronous mirror copy operation on the async secondary storage is a most current copy of the data based on selection from a group consisting of: a state of a consistent synchronous mirror copy relationship of the consistent synchronous mirror copy operation and whether the consistent synchronous mirror copy operation is at a start of a consistency group formation and is at an end of the consistency group formation;
  retrieving the most current copy of the data; and
  using the most current copy of the data for further processing.

10. The computer system of claim 9, wherein the operations further comprise:
  in response to determining that the consistent synchronous mirror copy relationship was in a duplex state at the end of the consistency group formation by the consistent synchronous mirror copy operation, determining that the data on the sync secondary storage is the most current copy of the data.

11. The computer system of claim 9, wherein the operations further comprise:
  in response to determining that the consistent synchronous mirror copy relationship was in a duplex state when a consistency group began to form by the consistent synchronous mirror copy operation, but was in a suspended state at the end of the consistency group formation by the consistent synchronous mirror copy operation, determining that the data on the sync secondary storage is the most current copy of the data.

12. The computer system of claim 9, wherein the operations further comprise:
  in response to determining that the consistent synchronous mirror copy relationship was in a suspended state at both the start of the consistency group formation and at the end of the consistency group formation by the consistent synchronous mirror copy operation, determining that the data on the async secondary storage is the most current copy of the data.

13. The computer system of claim 9, wherein the operations further comprise:
  in response to determining that the consistent synchronous mirror copy relationship is in a pending state, determining that the data on the async secondary storage is the most current copy of the data.

14. The computer system of claim 9, wherein the operations further comprise:
  in response to determining that the consistent synchronous mirror copy relationship moves to a duplex state while the consistent asynchronous mirror copy operation is draining a consistency group, updating a consistency group start state to duplex.

15. The computer system of claim 9, wherein at least one host, a primary storage controller, the primary storage, a sync secondary storage controller, the sync secondary storage, an async secondary storage controller, and the async secondary storage are in a cloud infrastructure.

16. The computer system of claim 9, wherein a Software as a Service (SaaS) is configured to perform the operations of the computer system.

17. A computer-implemented method, comprising operations for:
  initiating a consistent synchronous mirror copy operation to copy data from a primary storage to a sync secondary storage;
  initiating a consistent asynchronous mirror copy operation comprising an asynchronous mirror copy operation to copy the data from the primary storage to an async secondary storage and a point-in-time copy operation to copy data from the async secondary storage to a journal storage;
  determining which one of data of the consistent synchronous mirror copy operation on the sync secondary storage and data of the consistent asynchronous mirror copy operation on the async secondary storage is a most current copy of the databased on selection from a group consisting of: a state of a consistent synchronous mirror copy relationship of the consistent synchronous mirror copy operation and whether the consistent synchronous mirror copy operation is at a start of a consistency group formation and is at an end of the consistency group formation;

retrieving the most current copy of the data; and using the most current copy of the data for further processing.

18. The computer-implemented method of claim 17, further comprising operations for:

in response to determining that the consistent synchronous mirror copy relationship was in a duplex state at the end of the consistency group formation by the consistent synchronous mirror copy operation, determining that the data on the sync secondary storage is the most current copy of the data.

19. The computer-implemented method of claim 17, further comprising operations for:

in response to determining that the consistent synchronous mirror copy relationship was in a duplex state when a consistency group began to form by the consistent synchronous mirror copy operation, but was in a suspended state at the end of the consistency group formation by the consistent synchronous mirror copy operation, determining that the data on the sync secondary storage is the most current copy of the data.

20. The computer-implemented method of claim 17, further comprising operations for:

in response to determining that the consistent synchronous mirror copy relationship was in a suspended state at both the start of the consistency group formation and at the end of the consistency group formation by the consistent synchronous mirror copy operation, determining that the data on the async secondary storage is the most current copy of the data.

21. The computer-implemented method of claim 17, further comprising operations for:

in response to determining that the consistent synchronous mirror copy relationship is in a pending state, determining that the data on the async secondary storage is the most current copy of the data.

22. The computer-implemented method of claim 17, further comprising operations for:

in response to determining that the consistent synchronous mirror copy relationship moves to a duplex state while the consistent asynchronous mirror copy operation is draining a consistency group, updating a consistency group start state to duplex.

23. The computer-implemented method of claim 17, wherein at least one host, a primary storage controller, the primary storage, a sync secondary storage controller, the sync secondary storage, an async secondary storage controller, and the async secondary storage are in a cloud infrastructure.

24. The computer-implemented method of claim 17, wherein a Software as a Service (SaaS) is configured to perform the operations of the computer-implemented method.

* * * * *